United States Patent
Flowers et al.

(10) Patent No.: US 6,957,348 B1
(45) Date of Patent: Oct. 18, 2005

(54) INTEROPERABILITY OF VULNERABILITY AND INTRUSION DETECTION SYSTEMS

(75) Inventors: John S. Flowers, Emeryville, CA (US); Thomas C. Stracener, Emeryville, CA (US)

(73) Assignee: nCircle Network Security, Inc., San Francisco, CA (US)

(*) Notice: Subject to any disclaimer, the term of this patent is extended or adjusted under 35 U.S.C. 154(b) by 517 days.

(21) Appl. No.: 09/757,963

(22) Filed: Jan. 10, 2001

Related U.S. Application Data
(60) Provisional application No. 60/175,332, filed on Jan. 10, 2000.

(51) Int. Cl.$^7$ ............................................. G06F 11/30
(52) U.S. Cl. .................. 713/201; 713/200; 713/202; 709/223; 709/224; 370/229; 370/230; 370/241; 370/254; 370/255
(58) Field of Search ................. 713/201, 200; 709/223, 224; 370/229, 230, 241, 254, 255

(56) References Cited

U.S. PATENT DOCUMENTS

| | | | |
|---|---|---|---|
| 5,136,523 A | 8/1992 | Landers | 395/54 |
| 5,278,901 A | 1/1994 | Shieh et al. | 380/4 |
| 5,388,211 A | 2/1995 | Hornbuckle | |

(Continued)

FOREIGN PATENT DOCUMENTS

| | | | |
|---|---|---|---|
| WO | WO 01/31420 A2 | 5/2001 | |
| WO | WO0184270 A2 * | 8/2001 | |
| WO | WO0219661 A2 * | 3/2002 | H04L/29/06 |
| WO | WO 02/45380 A2 | 6/2002 | |
| WO | WO0310617 A1 * | 12/2003 | G06F/11/30 |

OTHER PUBLICATIONS

Johnson, Johna, Simulated Attack for Real Network Security, Nov. 1995, Data Communications, pp. 31–32.*
Anderson, Teresa, Hunting for Holes, Apr. 1996, Security Management, pp. 1–2.*
Breyfogle, Stacey, Don't Stop at Your Servers, Jan. 1998, Software Magazine, pp. 1–3.*
Microsoft Computer Dictionary, 2002, Microsoft Press, Fifth Edition, pp. 31, 256, 378, 405.*

(Continued)

*Primary Examiner*—Ayaz Sheikh
*Assistant Examiner*—Aravind Moorthy
(74) *Attorney, Agent, or Firm*—Fenwick & West LLP

(57) ABSTRACT

A system in accordance with an embodiment of the invention includes a vulnerability detection system (VDS) and an intrusion detection system (IDS). The intrusion detection system leverages off of information gathered about a network, such as vulnerabilities, so that it only examines and alerts the user to potential intrusions that could actually affect the particular network. In addition both the VDS and IDS use rules in performing their respective analyses that are query-based and that are easy to construct. In particular these rules are based on a set of templates, which represent various entities or processes on the network.

33 Claims, 4 Drawing Sheets

U.S. PATENT DOCUMENTS

| | | | | |
|---|---|---|---|---|
| 5,557,742 | A | * 9/1996 | Smaha et al. | 395/186 |
| 5,699,403 | A | * 12/1997 | Ronnen | 379/32 |
| 5,796,942 | A | 8/1998 | Esbensen | |
| 5,798,706 | A | 8/1998 | Kraemer et al. | |
| 5,802,320 | A | 9/1998 | Baehr et al. | 395/200.79 |
| 5,892,903 | A | * 4/1999 | Klaus | 395/187.01 |
| 5,919,257 | A | * 7/1999 | Trostle | 713/200 |
| 5,923,646 | A | * 7/1999 | Mandhyan | 370/254 |
| 5,931,946 | A | 8/1999 | Terada et al. | |
| 5,958,015 | A | 9/1999 | Dascalu | |
| 5,961,644 | A | * 10/1999 | Kurtzberg et al. | 713/200 |
| 5,991,881 | A | 11/1999 | Conklin et al. | |
| 6,006,328 | A | 12/1999 | Drake | |
| 6,088,804 | A | 7/2000 | Hill et al. | |
| 6,101,606 | A | 8/2000 | Diersch et al. | |
| 6,185,689 | B1 | * 2/2001 | Todd, Sr. et al. | 713/201 |
| 6,199,181 | B1 | 3/2001 | Rechef et al. | 713/201 |
| 6,263,444 | B1 | 7/2001 | Fujita | |
| 6,269,447 | B1 | * 7/2001 | Maloney et al. | 713/201 |
| 6,279,113 | B1 | 8/2001 | Vaidya | |
| 6,282,546 | B1 | 8/2001 | Gleichauf et al. | |
| 6,298,445 | B1 | * 10/2001 | Shostack et al. | 713/201 |
| 6,301,668 | B1 | 10/2001 | Gleichauf et al. | |
| 6,321,338 | B1 | 11/2001 | Porras et al. | |
| 6,324,656 | B1 | * 11/2001 | Gleichauf et al. | 714/37 |
| 6,330,562 | B1 | 12/2001 | Boden et al. | |
| 6,343,362 | B1 | * 1/2002 | Ptacek et al. | 713/201 |
| 6,347,376 | B1 | 2/2002 | Attwood et al. | |
| 6,359,557 | B2 | 3/2002 | Bilder | |
| 6,363,489 | B1 | * 3/2002 | Comay et al. | 713/201 |
| 6,370,648 | B1 | 4/2002 | Diep | |
| 6,408,391 | B1 | 6/2002 | Huff et al. | |
| 6,415,321 | B1 | * 7/2002 | Gleichauf et al. | 709/224 |
| 6,470,384 | B1 | * 10/2002 | O'Brien et al. | 709/223 |
| 6,473,800 | B1 | 10/2002 | Jerger et al. | 709/226 |
| 6,477,651 | B1 | * 11/2002 | Teal | 713/200 |
| 6,484,315 | B1 | * 11/2002 | Ziese | 717/173 |
| 6,490,626 | B1 | 12/2002 | Edwards et al. | 709/229 |
| 6,584,569 | B2 | 6/2003 | Reshef et al. | 713/261 |
| 6,609,205 | B1 | * 8/2003 | Bernhard et al. | 713/201 |
| 6,708,212 | B2 | * 3/2004 | Porras et al. | 709/224 |
| 6,711,127 | B1 | * 3/2004 | Gorman et al. | 370/230 |
| 6,735,169 | B1 | * 5/2004 | Albert et al. | 370/229 |
| 6,771,597 | B2 | * 8/2004 | Makansi et al. | 370/230 |
| 6,775,657 | B1 | * 8/2004 | Baker | 706/45 |
| 2002/0133721 | A1 | 9/2002 | Adjaoute | |

OTHER PUBLICATIONS

Rebecca Bace, Infidel, Inc. "An Introduction to Intrusion Detection and Assessment", 1999, 38 pages.

Fyodor, "Remote OS detection via TCP/IP Stack Finger-Printing", Oct. 18, 1998, 10pages.

Abstract, W. Erhard, et al., "Network Traffic Analysis and Security Monitoring With UniMon", Proceeding of the IEEE Conference on High Performance Switching and Routing, 2000, ATM 2000, pp 439–46 (Jun. 2000).

Abstract, Dept. of Comput. Sci., California Univ., Davis, CA, USA, "A Methodology For Testing Intrusion Detection Systems," IEEE Transactions on Software Engineering, vol. 22, Issue 10, pp 719–29 (Oct. 1996).

Abstract, Mounji A. Le Charlier, et al., "Distributed Audit Trail Analysis", Proceeding of the Symposium on Network and Distributed System Security, 1995, pp 102–12 (Feb. 16–17, 1995).

Abstract, L.T. Heberlein, et al., "A Network Security Monitor", Proceeding of the 990 IEEE Computer Society Symposium on Research in Security and Privacy, pp 296–04, (May 7–9, 1990).

Abstract, Xinzhou Quin et al., "Integrating Intrusion Detection and Network Management", Network Operation and Management Symposium, 2002, NAOMS 2002. 2002 IEEE/IFIP, pp 329–44 (Apr. 15–19, 2002).

Abstract, D.G. Schwartz et al., "A Case–Based Approach To Network Intrusion Detection", Proceeding of the 5th International Conference on Information Fusion, 2002. vol. 2 pp 1084–89 (Jul. 8–11, 2002).

Abstract, "Open Source Security: Opportunity or Oxymoron?" Computer, vol. 35, Issue 3, pp. 18–21 (Mar. 2002).

Abstract, Liu Dihua, et al. "Data Mining For Intrusion Detection", Proceedings ICII 2001—Beijing 2001 International Conference on Info–Tech and Info–Net, 2001, vol. 5, pp 7–12, (Oct. 29–Nov. 2001).

Abstract, Kai Hwang & M. Gangadharan, "Micro–Firewalls for Dynamic Network Security With Distributed Intrusion Detection", NCA 2001 IEEE International Symposium on Network Computing and Applications, 2001. pp. 68–79, (Oct. 8–10, 2001).

Abstract, Wenke Lee Stolfo, et al., "Real–Time Data Mining–Based Intrusion Detection", Proceedings DARPA Information Survivability Conference & Exposition II, 2001, DISCEX '01. vol. 1, pp 89–100 (Jun. 12–14, 2001).

Abstract, J. Burns, et al. Automatic Management Of Network Security Policy, Proceedings DARPA Information Survivability Conference & Exposition II, 2001, DISCEX '01. vol. 2, pp 12–26, (Jun. 12–14, 2001).

Abstract, Heberlein, et al. "A Network Security Monitor", 1990, Proceedings Research in Security & Privacy 1990 IEEE Computer Society Symposium on, pp 296–304, (May 7–9, 1990).

Ristenbatt, Martin P., Methodology For Network Communication Vulnerability Analysis, IEEE, 1988, pp. 493–499.

Skaggs, B., et al., Network Vulnerability Analysis, IEEE, 2002, pp. 493–495.

Thatcher, Michelle, Keeping Your Technology Secure, Technology & Learning, Apr. 2002, pp. 38, 40, 42 and 44.

* cited by examiner

INTEROPERABILITY OF VULNERABILITY AND INTRUSION DETECTION SYSTEMS

RELATED APPLICATIONS

This application claims the benefit of U.S. Provisional Application No. 60/175,332, filed Jan. 10, 2000, which is incorporated herein by reference.

FIELD OF THE INVENTION

The present invention relates to network security systems. More particularly, the present invention relates to vulnerability detection systems, intrusion detection systems, communication between the two, and query-based rules for identifying vulnerabilities and detecting intrusions.

BACKGROUND

Computer networks are vulnerable to many threats that can inflict damage that can result in significant losses. These losses can stem from a number of sources including environmental hazards, hardware and software failure, user errors, or even malicious acts of others. A goal of network security is therefore to protect the confidentiality, integrity, and availability of information stored electronically in a network from these threatening sources.

Several conventional resources are available to protect a network from information losses. For instance, firewalls are used to enforce a boundary between two or more networks to filter incoming traffic (generally from the Internet) according to a security policy. Still, firewalls are inadequate to fully protect a network since users may not always obtain access to a network through the Internet (for instance, a user could circumnavigate the firewall by using a modem connection). In addition to the many ways a network can be attacked externally, not all threats originate outside the firewall and can come from within the network. Further, firewalls themselves are subject to attack, which can render the firewall ineffective.

Therefore, networks need to rely on resources other than firewalls for network security. Such resources include vulnerability detection tools and intrusion detection tools. Vulnerability detection tools perform examinations of a network to determine weaknesses in the network that might allow security violations—in other words, they determine where in a network an attack is possible. Similarly, intrusion detection tools monitor a network for intrusive traffic and notify a network administrator of suspicious traffic so that corrective action can be taken.

Nonetheless, vulnerability detection systems and intrusion detection systems are inherently complex and typically lack interoperability. Security engineers need to know what types of attack signatures to look for, how to look for them, and how to respond to an identified attack. But typically, the intrusion detection system cannot obtain an accurate picture on the network and cannot leverage off of the risk analysis conducted by the vulnerability detection system. As a result, a great burden falls upon the security engineer responsible for the network configuration. The security engineer must also constantly examine extensive log data generated from other devices, as well as remain aware of changes occurring within the network. Moreover, such intrusion detection systems frequently burden security engineers with false alarms—alerting the security engineer to traffic that is not harmful to the present system, although it may be harmful to other systems.

To further burden the security engineer, each vulnerability or potential intrusion needs to be identified and a description of it stored for use by the vulnerability or intrusion detection tools. This process, however, is often complicated. For instance, it is extremely difficult just to write an application that would check a Secure Shell (SSH) server to determine if the remote system was running a version of SSH that is vulnerable to a Denial of Service attack. Traditional development methodologies force the user to have an intimate understanding of TCP/IP and a low-level (often cumbersome) development language such as ANSI C or Perl. Even advanced "Attack Scripting Languages" are overly cumbersome and require an understanding of variables, "for" loops, "while" loops, and other development syntax.

Thus, there is a need to develop a vulnerability detection system and intrusion detection system that can leverage off one another. Further, there is a need to perform vulnerability and intrusion identification and description that is usable by typical network engineers.

SUMMARY

A system and method in accordance with the invention is disclosed that not only allows an intrusion detection system (IDS) to leverage off the information gathered by the vulnerability detection system (VDS) but also allows a simple way to define rules for use by the vulnerability and intrusion detection systems to check for network conditions, such as vulnerabilities or intrusions.

More specifically, in one embodiment of the invention a VDS gathers information about a network and processes that information to determine vulnerabilities. The information is gathered and processed based on a set of rules stored in the VDS.

An IDS used with an embodiment of the invention monitors network traffic for signs of malicious activity. This analysis of network traffic is also based on a set of rules. However, the rules used by the IDS are determined based on the analysis of the network performed by the VDS—the IDS only monitors for intrusive traffic that can actually affect the particular network.

The rules used by the VDS and IDS are easily formed and therefore an end user, such as a security or network engineer, can easily define and construct rules beyond any that are defined by the VDS/IDS provider (which may also use the rule structure). In particular, each rule is formed based on a set of lexical elements that include, in one embodiment, a set of statements, a set of templates, and a set of reserved words. The templates form the fundamental basis for each rule, defining both entities, such as applications, ports, protocols, and actions. The actions direct the system to interact with an entity (such as an application) and elicit a response from the entity (in the case of a VDS) or to monitor for particular information in IP packets (in the case of an IDS). Rules in accordance with the invention are structured to resemble queries, such as those used in SQL. As such, if each part of a rule is true, then the rule is true. Accordingly, intrusion conditions and vulnerability conditions can be defined by rules, which, if true when evaluated based on information gathered by the VDS or IDS, indicate the presence of that condition.

BRIEF DESCRIPTION OF THE DRAWINGS

The present invention will be described with respect to particular embodiments thereof, and reference will be made to the drawings in which.

DETAILED DESCRIPTION

Figure 1:
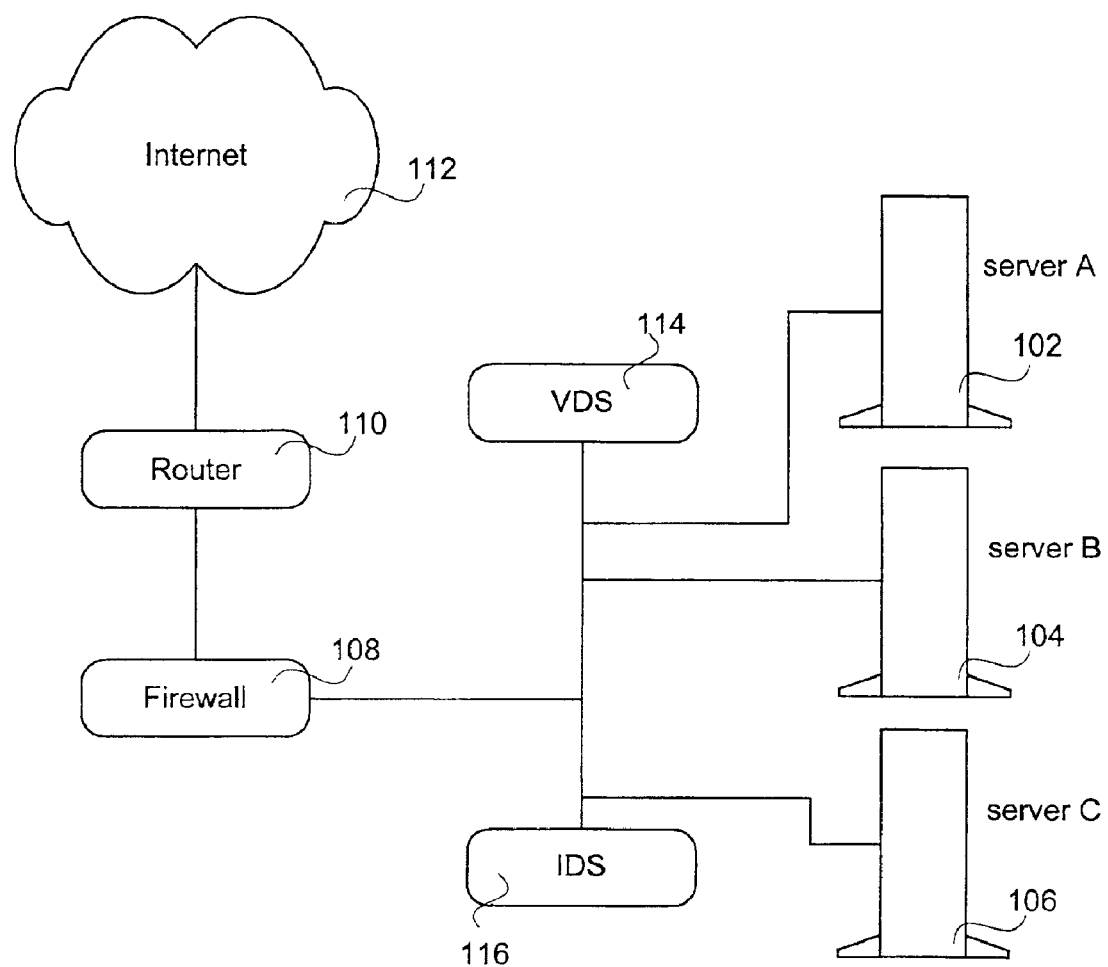
FIG. 1 is a generalized function block diagram of a system used with an embodiment of the invention.

In accordance with the invention, a system is disclosed that includes a vulnerability detection system (VDS) and an intrusion detection system (IDS) that communicate with one another and that use query-based rules to describe vulnerabilities and intrusions. FIG. 1 illustrates a system that can include various embodiments of the invention. As shown, a network 100 for use with an embodiment of the invention may have one or more servers. Three servers, 102, 104, and 106, are shown, but any number of servers can be present. Traffic from Internet 112 must pass through router 110 and then firewall 108 before it reaches any of the servers 102–106.

Vulnerability Detection. FIG. 1 further shows a VDS 114 used with an embodiment of the invention. VDS 114 (1) gathers information about network 100, (2) processes that information to determine vulnerabilities, and (3) reports that information to a user.

In order to gather information about a network, VDS 114 interrogates the network resources (e.g., servers 102–106) by sending and receiving data in a specified format. In one embodiment, the data received by the VDS in response to its interrogation is automatically ("reflexively") provided by the servers 102–106 (for example) to the VDS in response to the data sent. Hence, this gathering information is sometimes referred to herein as "reflex testing." More detailed information on reflex testing can be found in application Ser. No. 09/648,211, filed Aug. 25, 2000, incorporated herein by reference.

The data received by the VDS is then compared with information stored in a "rules database," included in the VDS, where the VDS may be one or more physical devices. The rules database contains rules that describe vulnerabilities and provide a programmatic means to check for the presence of those vulnerabilities. In particular, the information received from a network 100 as a result of reflex testing is checked against the rules database and can be used to detect every device in the network 100, identify each host's operating system as well as the open ports of the host and the applications being run on them. This information is then used to identify vulnerabilities, which can then be eliminated or monitored. In one embodiment, the network is regularly scanned and the network's vulnerabilities regularly updated.

Intrusion Detection. Beyond reducing or eliminating vulnerabilities, there is a need to detect potential threats to network 100. Thus, an IDS 116 used with an embodiment of the invention examines network traffic for signs of malicious activity. IDS 116 uses rules similar to those used by the VDS to check for such malicious activity. In some embodiments, the rules used by the IDS and VDS are stored in the same database.

The rules used by the IDS are loaded into the IDS after every VDS scan of the network 100. However, the rules loaded are determined by the VDS vulnerability analysis, so that only rules that describe possible intrusion conditions as they exist for the specific network 100 are loaded. Such a system is referred to herein as a Target-based Intrusion Detection System, or "TIDS". Such a Target-based IDS will have the ability to monitor for specific conditions to which the network has been determined to be vulnerable, as well as any range of conditions or attacks to which the network might be vulnerable. For instance, if the VDS finds a type of service S, but has not verified S's vulnerability to a buffer overflow condition, the IDS may still monitor for such a buffer overflow. So if a vulnerability V is identified, the intrusion detection system is target-based by virtue of the fact that it monitors the system running with vulnerability V, it monitors for attacks on V, and it monitors for attacks that make sense to look for given the presence of V (but which may not be attacks against V itself).

Thus the IDS, and its relationship to the VDS can be conceptualized in terms of "Levels of Validity":

I. Strong (absolute) Validity: The IDS only monitors for those attacks against vulnerabilities which the VDS has confirmed with certainty;

II. Semi-Strong (partial) Validity: The IDS monitors for attacks against vulnerabilities which the VDS has confirmed, but also monitors for other attacks or vulnerabilities that are non-verified but generally prudent to look for, especially given the presence of a confirmed vulnerability; and III. Null validity: The IDS monitors for everything regardless of whether a vulnerability has been confirmed or not.

All currently existing IDS technologies are based on level III—"Null Validity." But a target-based IDS of the present invention enables validity levels I and II. Hence, the interoperability of the IDS and VDS allow the IDS rules to dynamically adapt to the network's topology, composition, and vulnerabilities. Therefore, unlike a traditional IDS, which reports more false alarms because it analyzes all traffic regardless of whether it could threaten the particular network, an embodiment of an IDS in accordance with the present invention only monitors for relevant intrusions—those to which the network is potentially vulnerable (levels I and II)—and it does not monitor for intrusions to which the network is not potentially vulnerable. As a result, because the IDS is sensitive to network topology as well as host operating systems and vulnerabilities, false alarms can be minimized. Such an IDS can adapt to changes in the environment without human intervention, and it allows levels of speed, efficiency, and accuracy to be attained that have previously been regarded as unachievable.

Overview of Rules

The rules referred to above that are stored in the rules database or loaded into the IDS are query-based, and resemble "assertions" or "queries" found in typical SQL. The rules are structured to be assertions that, if found true, identify the presence of a particular condition, such as an operating system, application, vulnerability, or intrusion. Hence, collectively, these rules serve to identify and name the characteristics and properties of the network 100. For instance, to test for a vulnerability in the Line Printer Daemon (LPD) that shipped with the Solaris (Trademark of Sun Microsystems) operating system, the following conditions must be checked: (1) the scanned server is running the Solaris operating system, and (2) the scanned server is running LPD. Thus, the rules are constructed to define a vulnerability if these two conditions are present.

Figure 2:
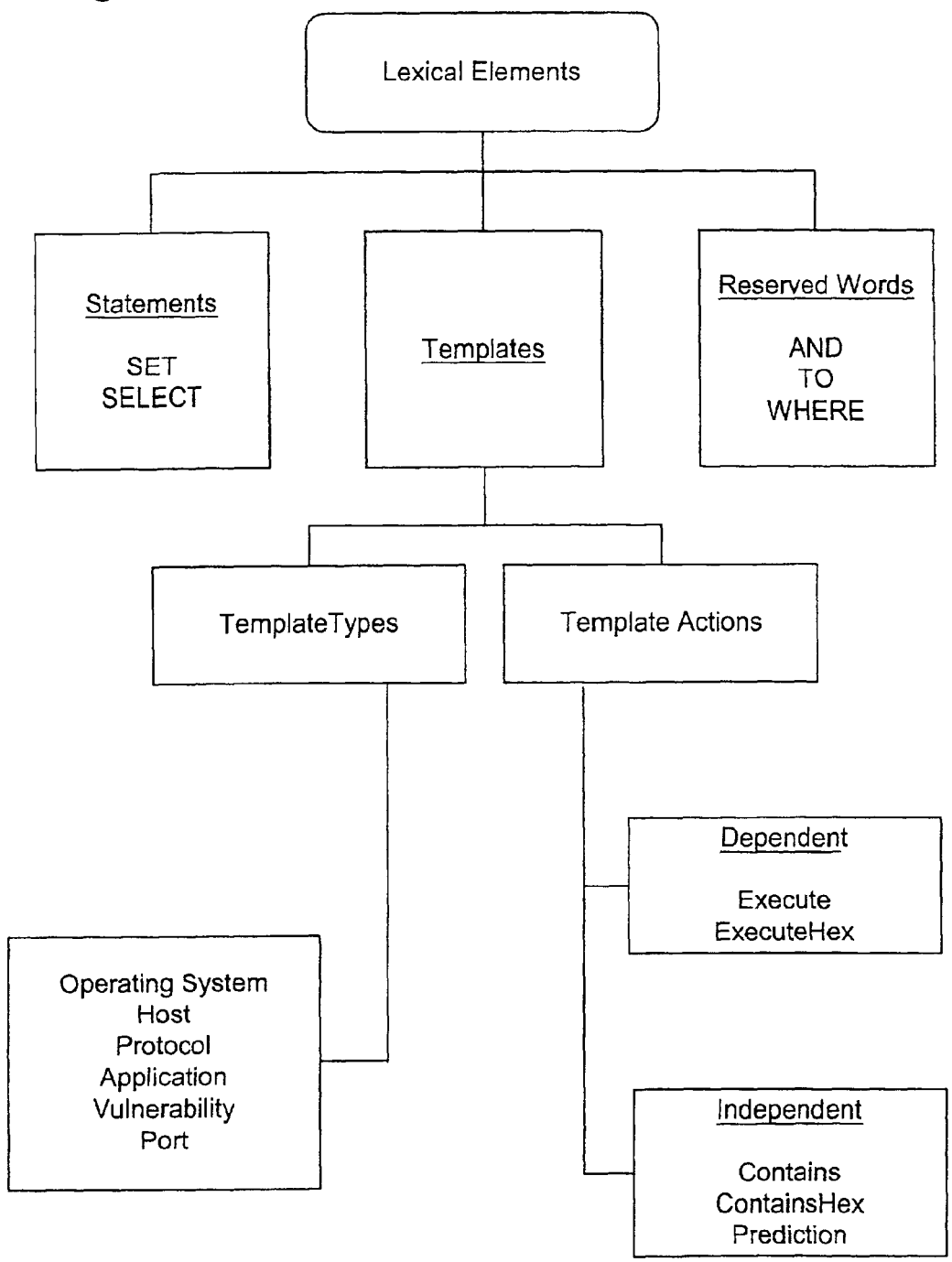
FIG. 2 is a block diagram illustrating the lexical elements of rules used with a VDS in accordance with an embodiment of the invention.
Figure 4:
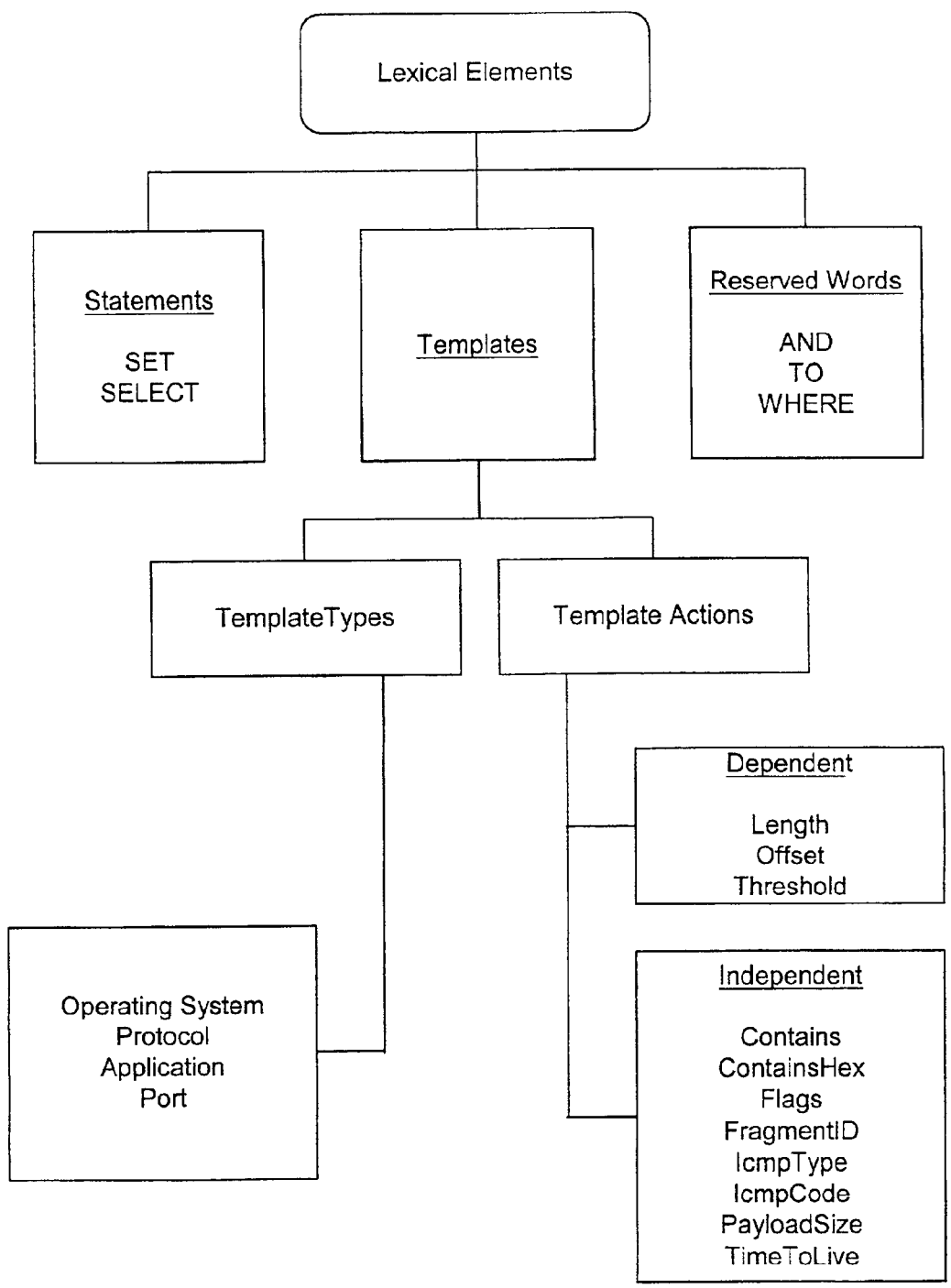
FIG. 4 is a block diagram illustrating the lexical elements of rules used with an IDS in accordance with an embodiment of the invention.

The rules are constructed from a base set of lexical elements, which include "templates," "statements," and "reserved words." In one embodiment, the rules used by the VDS 114 are constructed from 11 templates, 2 statements, and 3 reserved words, as shown in FIG. 2, while the rules used by IDS 116 are constructed from 2 statements, 15 templates, and 3 reserved words, shown in FIG. 4. These templates, statements, and reserved words will be discussed in more detail below.

Figure 3:
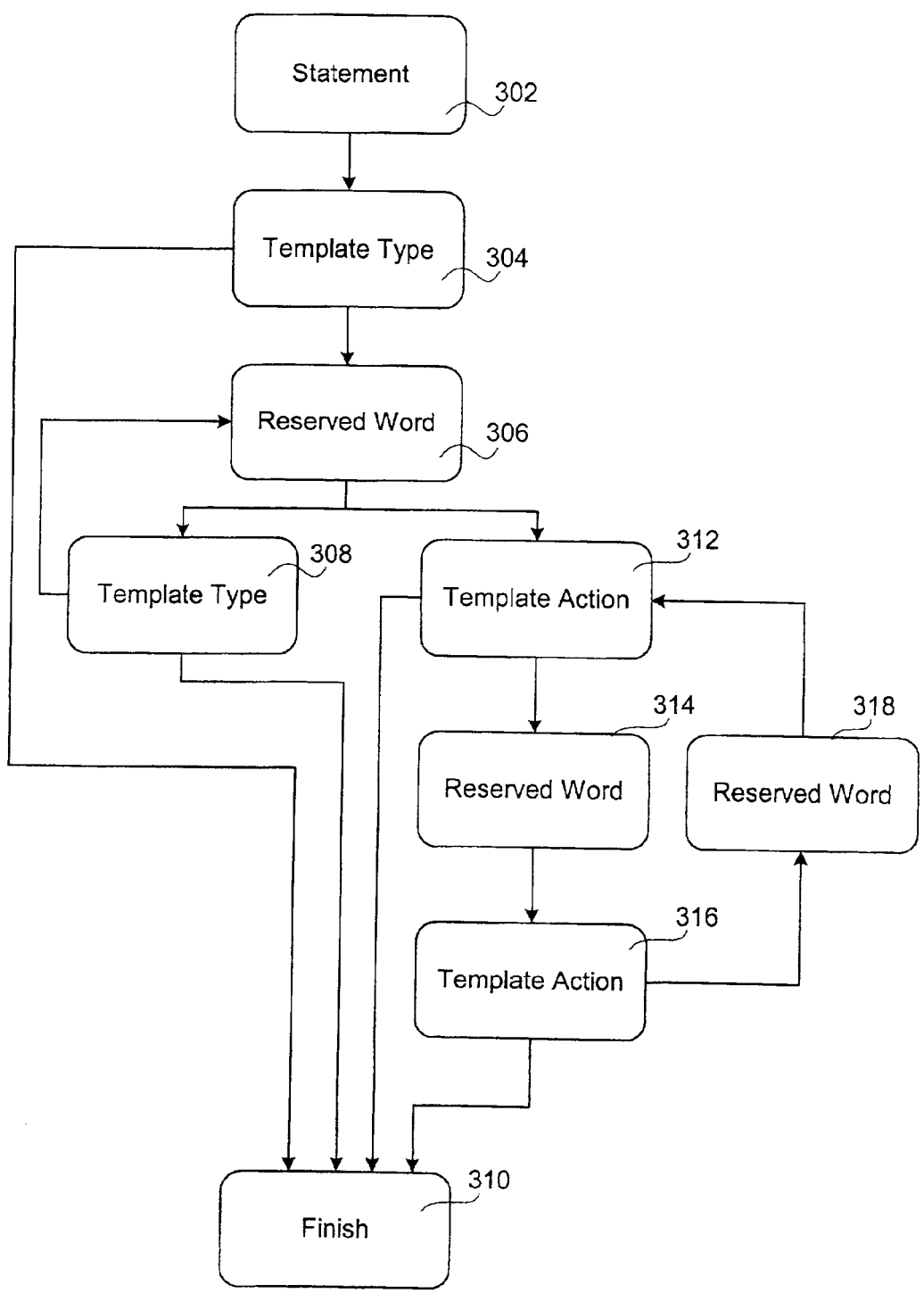
FIG. 3 is a flow diagram illustrating the syntactic ordering of lexical elements to form rules in accordance with an embodiment of the invention.

In addition, the syntactic ordering of the lexical elements to form the rules is shown in FIG. 3, which will also be referenced in the discussion below.

Lexical Elements for Vulnerability Detection Statements

Every rule begins with a statement. A statement is a term that establishes the role of the rule. In one embodiment, there are two kinds of statements: SELECT and SET. All capitals are used to designate statements within rules.

The SELECT statement is the first lexical element for most rules. SELECT is used to reference one or more "Template Types," discussed below, and is used in the following form:

SELECT Template Type[ID]

The SET statement is used to create new templates and is not used by an end user (such as a security engineer) in one embodiment, but only by the VDS/IDS provider. The SET statement is used to assign a template to a particular reflex response resulting from reflex testing, such as operating system reflexes or application reflexes. The SET statement is usually used in the following form:

SET TemplateType[ID] TO { . . . reflex signature/response . . . }

The TemplateType field will be discussed below. "Reflex signature/response" correlates to a complex description of data that may be received as a result of reflex testing. The details of that complex description are omitted here a they are not necessary to form an understanding of the invention.

Reserved Words

Reserved words are used to create complex rules by establishing logical and functional relationships between multiple templates. There are three reserved words: AND, TO, and WHERE. Reserved words are shown herein in all capitals.

The reserved words AND is the logical operator of conjunction, logically connecting multiple templates. In order for a rule with AND to be true, each of the conditions flanking the AND must be satisfied. The reserved word AND is used as follows:

SELECT TemplateType AND TemplateType AND . . .

The reserved word TO is a connective that is used in combination with the SET statement to assign a reflex signature TO a template type. The use of the reserved word TO is illustrated above with the SET statement.

The reserved word WHERE is a functional connective used to invoke Template Actions (discussed below). In a rule using WHERE, the entity on which the specified Template Action is executed to specified by the Template Type immediately preceding the WHERE term. Thus, term ordering is important for any template actions to the right of the WHERE word. Template Actions are executed in the order they are listed from left to right. In contrast, when multiple independent Template Types are placed in conjunction using the reserved word AND, the ordering of the templates is unimportant.

The reserved word WHERE is used as follows:

SELECT TemplateType[A] AND TemplateType[B] WHERE TemplateAction[Action]

Hence the reserved word WHERE specifies a Template Action to be performed on the entity identified by TemplateType[B].

Templates

Templates form the fundamental basis of rules formed in accordance with the invention, representing various entities or processes. Templates fall into two classes: Template Types and Template Action. Templates in either class can also be anonymous or non-anonymous, dependent or independent.

Some templates require qualification—they require more specific information. Such templates are referred to herein as "non-anonymous," and qualifiers are appended to the specified template in brackets. Templates that do not require qualification are said to be "anonymous."

It is sometimes necessary for a template of a given class to be followed by an additional template, requiring closure. Such templates are referred to as "dependent." In some embodiments, dependent templates fall into two categories: "indefinite closure dependent templates" and "definite closure templates." Indefinite closure dependent templates can be closed by any corresponding template of the same class while definite closure templates must be closed by a specific template. Templates that do not need to be followed by another temperature are "independent." This concept of dependent templates will become more clear with the discussion below.

Template Types

Template Types are like a genus in the taxonomic sense; that is, a Template Type is the name for a broad "type" of entity. In an embodiment of the invention used with a VDS, there are six Template Types: Operating System, Host, Application, Port, Protocol, and Vulnerability. Each of these Template Types is discussed below.

An Application template corresponds with a particular application. When selected, an Application template establishes a condition that is true when the specified application is detected on a remote host. Accordingly, the Application Template is used when vulnerability conditions include the presence of one or more applications. The syntax for the Application template is as follows:

SELECT Application[Application_ID]

As shown and referring to FIG. 3, a "statement" (SELECT) forms the first part of the rule, step 302, followed by the Application template, step 304, at which point the rule is complete, 310. Thus, this is the simplest example of a rule formed.

The "Application_ID" is a qualifier identifying a particular application. In one embodiment, possible applications are given identification numbers such as shown in Table 1.

TABLE 1

| ID | Name/Port | ID | Name/Port | ID | Name/Port | ID | Name/Port |
|----|-----------|----|-----------|----|-----------|----|-----------|
| 1 | tcpmux/1 | 2 | compressnet-2/2 | 3 | compressnet-3/3 | 4 | rje/5 |
| 5 | echo/7 | 6 | discard/9 | 7 | systat/11 | 8 | daytime/13 |
| 9 | netstat/15 | 10 | qotd/17 | 11 | msp/18 | 12 | chargen/19 |
| 13 | ftp-data/20 | 14 | ftp/21 | 15 | ssh/22 | 16 | telnet/23 |
| 17 | priv-mail/24 | | | | | | |

Although 17 applications with default ports are shown in Table 1, in various embodiments, thousands of applications could be identified and given identification numbers. The number for the particular application sought in the rule is placed in the "Application_ID" field in one embodiment. So if a particular vulnerability is associated with the FTP application, the rule "SELECT Application[14]" may be invoked. Of course, in other embodiments a character string identifying the application name could be used, e.g., "FTP" could be placed in the Application_ID field instead of a number: SELECT Application[ftp].

The Host template will be true of any remote device that is detected on the network through reflex testing. Accordingly, the Host template is used when there is a vulnerability condition associated with the very presence of an operating system.

To illustrate, all versions of the BeOS (Trademark of Be Inc.) operating system are vulnerable to a remote denial-of-service attack that can be caused by sending the device specific kinds of non-standard packets. The BeOS TCP/IP stack immediately crashes whenever it receives a TCP or UDP packet in which the IP length is set to be less than the minimum header length for each respective protocol.

The syntax for the Host template is developed following steps 302, 304, and 310:

SELECT Host

As shown, the Host template need not be qualified by any additional identifiers or information (unlike the Application template), and is therefore "anonymous," while the Application template is "non-anonymous."

The Port template will be true if a specific port is open on a remote system. Accordingly, the Port template is used when one or more vulnerability conditions involve open ports. The Port template is non-anonymous and is used as follows:

SELECT Port[Port number]

The Protocol template will be true if a specific TCP/IP protocol is present. Qualifiers for the Protocol template are TCP and UDP.

An Operating System template, when placed in a rule, establishes a vulnerability condition that is true if the operating system for which the template is qualified is detected on a host. In one embodiment, every rule requires the use of at least one Operating System template. In this manner, only vulnerability conditions are checked that affect a particular operating system. For example, vulnerability conditions that only affect the Solaris platform are not tested against systems running Windows NT.

In some embodiments of the invention the Operating System template is structured much like the Application template, e.g., SELECT OperatingSystem[OS identifier]. But in other embodiments, because an operating system is identified for every rule, it is bound to the rule after the rest of the rule is constructed. For instance, in one embodiment, the user is prompted to enter the operating system associated with the rule either before or after the user constructs it. In some embodiments, such a prompt is realized using a graphical user interface (GUI) that includes a rule entry line (for entering all elements of the rule except the operating system) and an operating system entry line. In this manner, the complexity of rules as seen by the user is reduced, since one term is essentially eliminated.

In addition, each rule is named, thereby becoming associated with a particular vulnerability_ID, which can be a numerical identifier or a name. In some embodiments, nested rules can be created by using the Vulnerability template and selecting the vulnerability_ID of a previously entered rule. Accordingly, the rule under construction will inherent all of the template objects and relations of the referenced vulnerability. This template can be used to build complex rules while at the same time reducing the duplication of work. This mechanism allows the use of any completed rule template to serve as a modifier to any other. The syntax for the rules is:

SELECT Vulnerability [Vuln_ID] AND . . .

Template Actions

Template Actions are procedures that can be integrated into rules for the purpose of interacting with an application or service in a programmatic manner. Template Actions involve sending data to a particular entity and eliciting a response from that entity. In essence, then, Template Actions allow a user to create specific challenge-response tests. Template Actions include the following four templates in one embodiment: Contains, ContainsHex, Execute, ExecuteHex. No template actions are anonymous: all require some form of qualification.

The Contains template has two uses: (1) to follow the WHERE term or (2) to provide closure for the Execute or ExecuteHex templates (described below), which are dependent on the Contains template (or ContainsHex template) for closure. The Contains template is used to determined if an application response contains a specified string of characters. The syntax for three uses of the Contains template is:

SELECT TemplateType WHERE Contains[string]

SELECT TemplateType WHERE Execute[string] AND Contains [string]

SELECT TemplateType WHERE ExecuteHex[hex string]

AND Contains[string]

As shown, the Contains template is qualified with a string of data. The first syntactic example follows steps 302, 304, 306, 308, and 310. The second and third examples follows steps 302, 304, 306, 312, 314, 316, and 320.

To illustrate, a vulnerability condition exists in Qualcomm's (Trademark of Qualcomm Inc.) qpopper versions 3.0beta29 and below, which allow an attacker to execute malicious code by overwriting a buffer in the second argument of the LIST command. Thus, specific usage of a the Contains template appears in the following rule to identify this condition:

SELECT Application[96] WHERE Contains[+OK QPOP(version3.0b)]

Application[96] identifies the application qpopper in the above example.

The Execute template sends a string of data to a particular port or application. Hence the Execute template is used to send data to a remote system for the purpose of eliciting a response indicative of a vulnerability condition. The Execute template exhibits indefinite dependence with respect to the Contains or ContainsHex templates and must always be followed by the Contains or ContainsHex templates for closure. In addition, Execute is qualified with a string of data. The syntax for the Execute template is shown above. Any text that qualifies the template is sent to the entity identified by the TemplateType immediately preceeding the WHERE (such as application).

To illustrate, to test an FTP server to determine if it allows someone to log in with a user name of "anonymous" and a password of "anonymous," a rule may be structured as follows, where 331 and 230 are FTP reply codes:

SELECT Application[FTP] WHERE Execute[user anonymous] AND Contains[331] AND Execute[pass anonymous] AND Contains[230]

The ContainsHex template is used to compare a hexadecimal string to data returned as the result of the Execute or ExecuteHex templates. ContainsHex can be used to satisfy the template dependency of Execute or ExecuteHex. The syntax for one use of the ContainsHex template follows:

SELECT TemplateType WHERE Execute[string] and ContainsHex [hex string]

The ExecuteHex template is used to send hexadecimal data to a remote port or application to test for a particular vulnerability condition. Accordingly, ExecuteHex is used to interrogate network services or specific ports. ExecuteHex exhibits indefinite dependence with respect to the ContainsHex or Contains template, and is followed by the Contains or ContainsHex templates for closure. The syntax for the ExecuteHex template is:

SELECT TemplateType WHERE ExecuteHex[hex strings] AND Contains[string]

The Prediction template is used to test the predictability of TCP sequence numbers generated by a network, a vulnerability condition that is important for attacks involving IP spoofing or connecting hijacking. The Prediction template is qualified by a threshold value for the number of packets, but the "less than" (<) operator can be used. The Prediction template is preceded by SELECTing the Template Type Port with the port number "0", which indicates any port on the host. An example of a rule including the Prediction template is:

SELECT Port[0] WHERE Prediction[<500]

In this sample usage, the rule would be true for any specified operating system that generated packet sequence numbers which could be predicted by "listening" to less than 500 packets.

In summary, FIG. 3 illustrates the possible ordering of lexical elements in the construction of rules. In its simplest form a rule can be formed by a Statement, step 302, and a Template Type, step 304, e.g., SELECT Host. More complex statements, however, are subsequently linked with a Reserved Word, step 306, followed by a Template Type, step 308 or a Template Action, step 312. Still more complex, a rule can be sequentially formed with a Statement, step 302, a Template Type, step 304, a Reserved Word, step 306, a Template Action, step 312, a Reserved Word, step 314 and a Template Action, step 316. Finally, a rule can be formed with a Statement, step 302, a Template Type, step 304, a Reserved Word, step 306, a Template Action, step 312, a Reserved Word, step 314, a Template Action, step 316, Reserved Word, step 318, and a Template Action, step 312. Various other element combinations are possible as illustrated in FIG. 3.

Lexical Elements for Intrusion Detection

The rules for monitoring for intrusions are constructed similar to those for monitoring for vulnerabilities. The rules for IDS include the lexical elements of Statements, Template Types, Template Actions, and Reserved Words. The Statements and Reserved words are the same as for VDS, and therefore, will not be again explained. Moreover, the structure and syntax is also generally the same and will follow the sequencing of FIG. 3. However, as shown in FIG. 4, the templates are different, since they are used for a different function (monitoring for instructions rather than vulnerabilities) and are discussed below.

Template Types

The template types for monitoring for intrusions include four template types: protocol, port, application, and operating system. All are non-anonymous and require qualification. The operating system and application types are the same as for the VDS templates.

The Port template is qualified by port numbers, where only legitimate port number can be used as qualifiers. The Port template is used when a security issue involves open ports on a remote system. The Port template can be used as described with the VDS or immediately following the reserved word WHERE. Hence, the Port template is basically the same as that used with the VDS except the Port template can also accept port ranges using the ">" (greater than), "<" (less than), and "!" (not) symbols. Therefore, examples of use of the Port template include:

SELECT Port[1999]

SELECT TemplateType WHERE Port[>5999] and Port[<6010]

The Protocol template for use with IDS is similar to that used with the VDS, accepting various protocols for qualification, including UDP, TCP, and ICMP.

Template Actions

In the IDS, the Template Actions are procedures that are integrated into the rules that examine network traffic for the existence of specific conditions. TemplateActions involve the examination of specific fields of data in an IP packet (for instance) for predetermined values. Template Actions include: Contains, ContainsHex, Flags, FragmentID, IcmpCode, IcmpType, Length, Offset, PayloadSize, Threshold, and TimeToLive. All Template actions are non-anonymous, requiring qualification. Each will be discussed below.

"Contains" and "ContainsHex" are used with the reserved word WHERE and examine the payload of packet for a specific text of hexadecimal string using standard patternmatching functions known in the art. If the data contains the specific string of characters qualifying any instance of this template, the Contains template will be satisfied. Accordingly, the Contains template is used to detect intrusions that can be identified by strings of characters. The syntax for the Contains template is as follows:

SELECT TemplateType WHERE Contains[string]

Similarly, if the packet data contains the specific hex values provided for the template, the template will be satisfied. An example usage for the ContainsHex template is:

SELECT Application[130] WHERE ContainsHex [\xE8\xC0\xFF\xFF\xFF]

As shown, the ContainsHex template uses a hex value preceded by a forward slash.

The Flags template tests the flags of a TCP packet for specified bit settings. The Flags template is used to look for specific flags settings within the TCP header. Frequently, this template is used to determine when a session is either being established or has been established. Alternatively, this template could be used to detect "stealth" port-scanning and alert for policy violations.

Flag types are specified as follows:
F=FIN
S=SYN
R=RST
P=PSH
A=ACK
U=URG
2=Reserved bit 2
1=Reserved bit 1 (Msb of TCP flags field)
0=no bits set In some embodiments, modifiers that can also be used with the Flags template are:
*=Qualifies if any of the listed flags are set
+=Qualifies of the flags listed plus any others are set
!=Qualifies if the listed flags are not set An example usage of the use of the Flags template is:

SELECT Port[0] WHERE Flag[SF]

Hence, in this example the rule will be true if a packet destined for any port on the host has the FIN and SYN flags set. (Note that port[0] is used to herein to designate "any" port).

The FragmentID template checks the ID field of the IP header for a specified value. It is primarily useful for finding crafted packets containing known values such as "31337." To illustrate, the Jolt2 denial-of-service attack uses a crafted fragmented packet to disrupt service on certain operating systems. The identifying characteristics of this attack include a static IP fragment ID value of 1109 (0×455 hex):

SELECT Port[0] WHERE FragmentID[1109]

The IcmpType template describes the possible IcmpType values that may be encountered and will be true if the IcmpType field of the Icmp header of a packet matches a specified value. This template is frequently useful for determining when reconnaissance is being performed on a target network or host. The syntax for the IcmpType template is:

SELECT TemplateType WHERE IcmpType[value]

The values for the IcmpType template are as follows:
0=ECHO Reply
3=ICMP Unreachable
4=Icmp Source Quench
5=Icmp Redirect
8=Icmp ECHO
9=Icmp Rout Advertisement
10=Icmp Router Solicitation
11=Icmp TTL Exceeded
12=Icmp Parameter Problem
13=Icmp Timestampd
14=Icmp Timestamp reply
15=Icmp Info Request
16=Icmp Info Request Reply
17=Icmp Netmask Request
18=Icmp Netmask Reply The IcmpCode template examines the Code field in an Icmp header. Various types of Icmp datagrams have unique codes, which determine their purpose and function.

The Length template places restrictions on the depth that a Contains or ContainsHex template searches into a packet payload for a pattern match. Thus, the Length template is dependent on the presence of a Contains or ContainsHex template for closure and is always used with one of those templates. Syntax for the Length template is:

SELECT TemplateType WHERE Contains[string] AND Length [value]

The Offset template specifies the beginning offset into the packet payload at which to start a Contains or ContainsHex template pattern match. As such, it is only useful within the context to the Contains and ContainsHex templates and is dependent on one of those templates being present. Syntax for the Offset template is:

SELECT TemplateType WHERE Contains[string] AND Offset [value]

The PayloadSize template qualifies the size of the payload in an IP packet. It is useful for detecting buffer-overflow conditions and application-level attacks. The syntax for the PayloadSize template is:

SELECT TemplateType WHERE PayloadSize[value]

The Threshold template is used to specify a count of events taking place over a period of time. If the specified number of events match a threshold value set for the time period, the Threshold template is true. This template is dependent (indefinite closure dependent) and requires an independent template to be specified to provide closure. Syntax for the Treshold template is:

SELECT TemplateType WHERE Threshold[value] AND . . .

The TimeToLive field in an IP header contains a decrementing counter value to prevent packets from getting stuck in infinite routing loops. It is of primary interested in the IDS for detecting traceroute attempts on a target host or "Firewalking." Accordingly, the TimeToLive template is used to detect IP packets having a TimeToLive field set to a particular value. The syntax for the TimeToLive template is:

SELECT TemplateType WHERE TimeToLive[value]

In addition to the specific syntax and operations described above for VDS and IDS, rules can become logically linked and related through binding and inheritance.

Binding is an operation in which one or more rules are logically connected to a particular vulnerability or intrusion object (e.g., the applications identified in Table 1). Each bound rule is tested against a host. If any one of the rules is satisfied by the conditions of the host, then the vulnerability or intrusion condition is true. Thus, binding acts as an implicit "OR".

Binding also occurs between vulnerability and intrusion objects. For example, by binding attack A to vulnerability V, the IDS will begin monitoring for occurrences of A as soon as the VDS finishes a network scan in which V is detected.

Rules can also inherit characteristics from other rules in some embodiments. As discussed with respect to the vulnerability template, rules can be named, numbered, or otherwise identified, and that identification can be incorporated into a rule by an appropriate template. Although only the vulnerability template for the VDS is discussed to provide inheritance, there is no reason why a similar template could not be provided in the IDS arena in various embodiments.

Although a number of lexical elements have been identified and described herein for one embodiment of the invention, other embodiments may utilize more, fewer, or other lexical elements.

A system in accordance with the invention has been described that makes administering a network considerably easier since the VDS and IDS communicate regarding the network, allowing the IDS to leverage off of the VDS to monitor only for relevant intrusions. Moreover, a system in accordance with the invention uses query-based rules, allowing a user to easily construct rules that define network conditions, such as vulnerabilities or intrusions. It should be understood, however, that an embodiment of the invention may include many rules predefined and stored in such a system by the provider of the system, but that still allows additional rules construction by the end user.

In one embodiment of the invention, a VDS and an IDS are hardware devices, but in other embodiments they could be implemented with software or firmware. In addition, a rule constructor as described can be implemented with hardware, software, or firmware as part of the VDS or IDS, but in most embodiments will have an interface, such as a GUI, to receive information from the user as to how the rule should be constructed.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A computer-implemented system for protecting a network, comprising:
   a vulnerability detection system (VDS) for gathering information about the network to determine vulnerabilities of a host from a plurality of hosts on the network; and
   an intrusion detection system (IDS), cooperative with the VDS, for examining network traffic responsive to the vulnerabilities of the host from the plurality of hosts as determined by the VDS to detect traffic indicative of malicious activity.

2. The system of claim 1, wherein the VDS is adapted to gather information about the network by sending data to the plurality of hosts and receiving responsive data form the plurality of hosts.

3. The system of claim 1, wherein the VDS is adapted to gather information automatically provided by the plurality of hosts.

4. The system of claim 1, further comprising:
   a vulnerabilities rules database, in communication with the VDS, for storing rules describing vulnerabilities of the plurality of hosts,
   wherein the VDS is adapted to analyze the gathered information with the rules to determine the vulnerabilities of the plurality of hosts.

5. The system of claim 4, wherein the VDS is adapted to analyze the gathered information with the rules to identify operating systems on the plurality of hosts and determine the vulnerabilities responsive to the respective operating systems.

6. The system of claim 4, wherein the VDS is adapted to analyze the gathered information with the rules to identify open ports on the plurality of hosts and determine the vulnerabilities based on the open ports.

7. The system of claim 4, wherein the VDS is adapted to analyze the gathered information with the rules to identify applications executing on the plurality of hosts and determine the vulnerabilities based on the application.

8. The system of claim 1, further comprising:
   an intrusion rules database, in communications with the IDS, for storing rules describing malicious activity,
   wherein the IDS is adapted to analyze the network traffic with the rules to detect network traffic indicative of exploitations of the determined vulnerabilities.

9. The system of claim 1, wherein the IDS is adapted to detect traffic indicative of exploitations of only the determined vulnerabilities.

10. The system of claim 1, wherein the VDS is adapted to update the determined vulnerabilities, and wherein the IDS is adapted to detect traffic indicative of malicious activity in response to the update.

11. The system of claim 10, wherein the VDS is adapted to update the determined vulnerabilities in response to a change in the network.

12. A computer-implemented method for protecting a network comprising:
   gathering information about the network to determine vulnerabilities of a host from a plurality of hosts on the network; and
   cooperative with the step of gathering information, examining network traffic responsive to the determined vulnerabilities of the host from the plurality of hosts to detect network traffic indicative of malicious activity.

13. The method of claim 12, wherein gathering information comprises sending data to plurality of hosts on the network and receiving responsive data from the plurality of hosts.

14. The method of claim 12, wherein gathering information comprises receiving data automatically provided by the plurality of hosts on the network.

15. The method of claim 12, further comprising:
   storing rules to describe vulnerabilities of the plurality of hosts,
   wherein determining vulnerabilities includes analyzing the gathered information with the rules.

16. The method of claim 15, wherein determining vulnerabilities comprises analyzing the gathered information with the rules to identify operating systems on the plurality of hosts.

17. The method of claim 15, wherein determining vulnerabilities comprises analyzing the gathered information with the rules to identify open ports on the plurality of hosts.

18. The method of claim 15, wherein determining vulnerabilities comprises comparing the gathered information against the rules to identify applications on the plurality of hosts.

19. The method of claim 12, further comprising:

storing rules describing malicious activity, wherein detecting network traffic indicative of malicious activity comprises analyzing the network traffic with the rules to detect traffic indicative of exploitation of the determined vulnerabilities.

20. The method of claim 12, wherein examining network traffic consists of detecting traffic indicative of exploitations of only the determined vulnerabilities.

21. The method of claim 12, further comprising:

updating the determined vulnerabilities and detecting traffic indicative of malicious activity in response to the update.

22. The method of claim 21, wherein the updating is responsive to a change in the network.

23. A computer program product, comprising:

a computer-readable medium having computer program logic embodied therein for protecting a network, the computer logic:

gathering information about the network to determine vulnerabilities of a host from a plurality of hosts on the network; and cooperative with the step of gathering information, examining network traffic responsive to the determined vulnerabilities of the host from the plurality of hosts to detect network traffic indicative of malicious activity.

24. The computer program product of claim 23, wherein gathering information comprises sending data to plurality of hosts on the network and receiving responsive data from the plurality of hosts.

25. The computer program product of claim 23, wherein gathering information comprises receiving data automatically provided by the plurality of hosts on the network.

26. The computer program product of claim 23, further comprising:

storing rules to describe vulnerabilities of the plurality of hosts, wherein determining vulnerabilities includes analyzing the gathered information with the rules.

27. The computer program product of claim 26, wherein determining vulnerabilities comprises analyzing the gathered information with the rules to identify operating systems on the plurality of hosts.

28. The computer program product of claim 26, wherein determining vulnerabilities comprises analyzing the gathered information with the rules to identify open ports on the plurality of hosts.

29. The computer program product of claim 26, wherein determining vulnerabilities comprises comparing the gathered information against the rules to identify applications on the plurality of hosts.

30. The computer program product of claim 23, further comprising:

storing rules describing malicious activity;

wherein detecting network traffic indicative of malicious activity comprises analyzing the network traffic with the rules to detect traffic indicative of exploitations of the determined vulnerabilities.

31. The computer program product of claim 23, wherein examining network traffic consists of detecting traffic indicative of exploitations of only the verified vulnerabilities.

32. The computer program product of claim 23, further comprising:

updating the determined vulnerabilities; and detecting traffic indicative of malicious activity in response to the update.

33. The computer program product of claim 32, wherein the updating is responsive to a change in the network.

* * * * *

UNITED STATES PATENT AND TRADEMARK OFFICE
CERTIFICATE OF CORRECTION

PATENT NO. : 6,957,348 B1  
DATED : October 18, 2005  
INVENTOR(S) : John S. Flowers et al.

It is certified that error appears in the above-identified patent and that said Letters Patent is hereby corrected as shown below:

Column 14,  
Line 1, change "form" to -- from --;  
Line 25, change "application" to -- applications --;  
Line 27, change "communications" to -- communication --; and Column 15,  
Line 12, change "exploitation" to -- exploitations. --.

Signed and Sealed this

Tenth Day of January, 2006

JON W. DUDAS  
*Director of the United States Patent and Trademark Office*